(12) United States Patent
Shimizu et al.

(10) Patent No.: US 10,543,604 B2
(45) Date of Patent: Jan. 28, 2020

(54) FAILURE DIAGNOSTIC DEVICE AND FAILURE DIAGNOSTIC METHOD

(71) Applicant: NISSAN MOTOR CO., LTD., Kanagawa (JP)

(72) Inventors: Toshiyuki Shimizu, Kanagawa (JP); Masaki Kuno, Kanagawa (JP); Toru Takagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/575,605

(22) PCT Filed: May 21, 2015

(86) PCT No.: PCT/JP2015/064552
§ 371 (c)(1),
(2) Date: Nov. 20, 2017

(87) PCT Pub. No.: WO2016/185593
PCT Pub. Date: Nov. 24, 2016

(65) Prior Publication Data
US 2018/0154529 A1 Jun. 7, 2018

(51) Int. Cl.
*B25J 19/02* (2006.01)
*B25J 9/16* (2006.01)
(Continued)

(52) U.S. Cl.
CPC ............ *B25J 19/02* (2013.01); *B25J 9/1674* (2013.01); *G01L 3/00* (2013.01); *G01L 5/0061* (2013.01); *Y10S 901/46* (2013.01)

(58) Field of Classification Search
CPC ........ B25J 19/02; B25J 9/1674; B25J 5/0061; Y10S 901/46; G01L 3/00
(Continued)

(56) References Cited

U.S. PATENT DOCUMENTS 5,631,851 A * 5/1997 Tanaka ............... G05B 19/4062
700/174
5,697,582 A * 12/1997 Surauer .................... B64G 1/24
244/168
(Continued)

FOREIGN PATENT DOCUMENTS

EP          0566741 A1    10/1993
JP       H06-170540 A     6/1994
(Continued)

OTHER PUBLICATIONS

Roland Rau, "Seasonality in Human Mortality", Chapter 3 measuring seasonality, Springer, ISBN 978-3-540-44902-7, 2007.*

Primary Examiner — Sujoy K Kundu
Assistant Examiner — Douglas Kay
(74) *Attorney, Agent, or Firm* — Osha Liang LLP

(57) ABSTRACT

A failure diagnostic device for performing a failure diagnosis on a multi-axis robot includes a position detector that detects a movement position of each of joint shafts included in the multi-axis robot, a torque detector that detects a disturbance torque applied to the joint shaft, a routine-operation determination circuit that determines whether or not the multi-axis robot is executing a predefined routine operation, from the movement position detected by the position detector, a reference-value calculation circuit that calculates a disturbance-torque reference value from the disturbance torque detected during execution of the routine operation, a torque correction circuit that corrects the disturbance torque detected while the multi-axis robot executes an operation different from the routine operation by using the disturbance-torque reference value, calculated by the reference-value calculation circuit, to thereby acquire a corrected disturbance torque, and a failure diagnostic circuit that performs a failure diagnosis.

12 Claims, 11 Drawing Sheets

(51) Int. Cl.
　　　*G01L 3/00*　　　(2006.01)
　　　*G01L 5/00*　　　(2006.01)
(58) Field of Classification Search
　　　USPC .......................................................... 702/41
　　　See application file for complete search history.

(56) References Cited

U.S. PATENT DOCUMENTS

| | | | | |
|---|---|---|---|---|
| 6,218,801 | B1* | 4/2001 | Brog.ang.rdh | B25J 9/1674 |
| | | | | 318/565 |
| 6,232,572 | B1* | 5/2001 | Kanjo | B23K 11/115 |
| | | | | 219/110 |
| 6,438,454 | B1* | 8/2002 | Kuroki | B25J 13/003 |
| | | | | 700/108 |
| 7,348,746 | B2* | 3/2008 | Ogawa | B25J 9/1674 |
| | | | | 318/565 |
| 7,853,339 | B2* | 12/2010 | Miller | G05B 23/021 |
| | | | | 700/28 |
| 9,073,213 | B2* | 7/2015 | Nakata | B25J 9/1674 |
| 2005/0264251 | A1 | 12/2005 | Bischoff et al. | |
| 2007/0067678 | A1 | 3/2007 | Hosek et al. | |
| 2007/0210647 | A1* | 9/2007 | Miyazaki | B60T 13/662 |
| | | | | 303/155 |
| 2007/0255442 | A1* | 11/2007 | Nakamura | G05B 23/024 |
| | | | | 700/108 |
| 2011/0054680 | A1* | 3/2011 | Nakata | B25J 9/1674 |
| | | | | 700/245 |
| 2012/0283873 | A1* | 11/2012 | Le | B25J 9/1674 |
| | | | | 700/250 |
| 2014/0288881 | A1* | 9/2014 | Starr | B66F 19/00 |
| | | | | 702/183 |
| 2018/0133897 | A1* | 5/2018 | Shimizu | B25J 9/1674 |

FOREIGN PATENT DOCUMENTS

| | | | |
|---|---|---|---|
| JP | H09-174482 A | | 7/1997 |
| JP | 2009297827 A | * | 12/2009 |
| JP | 2010-271185 A | | 12/2010 |
| JP | 2013-184249 A | | 9/2013 |
| JP | 2013184249 A | * | 9/2013 |
| JP | 2014-018941 A | | 2/2014 |
| JP | 2014-117787 A | | 6/2014 |
| JP | 2014-155985 A | | 8/2014 |

* cited by examiner (a)

(b)

(a)

(b)

FAILURE DIAGNOSTIC DEVICE AND FAILURE DIAGNOSTIC METHOD

BACKGROUND

Technical Field

The present invention relates to a failure diagnostic device for and a failure diagnostic method of performing a failure diagnosis on a multi-axis robot.

Related Art

Patent Literature 1 has been disclosed as a conventional failure diagnostic method for an articulated industrial robot. In the failure diagnostic method disclosed in Patent Literature 1, while a robot is in operation, the movement position of each joint shaft of the robot and the disturbance torque applied to the joint shaft are detected at predetermined intervals, and the average of the disturbance torque at each detected movement position is calculated. Then, this average and a preset threshold are compared and, if the average is greater than the preset threshold, it is determined that the robot is experiencing an abnormality or failure.

Patent Literature 1: Japanese Patent Application Publication No. H9-174482

SUMMARY OF INVENTION

However, the disturbance torque can differ depending on the robot that executes the operation. Thus, it has been necessary to set a different threshold for each robot in advance.

A failure diagnostic device and a failure diagnostic method according to one or more embodiments of the present invention is capable of performing an accurate failure diagnosis using a fixed threshold regardless of which robot executes the operation.

One or more embodiments of the present invention provides a failure diagnostic device for and a failure diagnostic method of performing a failure diagnosis on a multi-axis robot, which calculates a disturbance torque reference value from each disturbance torque detected during execution of a predefined routine operation, corrects the disturbance torque by using the calculated disturbance torque reference value, and performs a failure diagnosis by comparing the corrected disturbance torque and a threshold.

DETAILED DESCRIPTION

Figure 1:
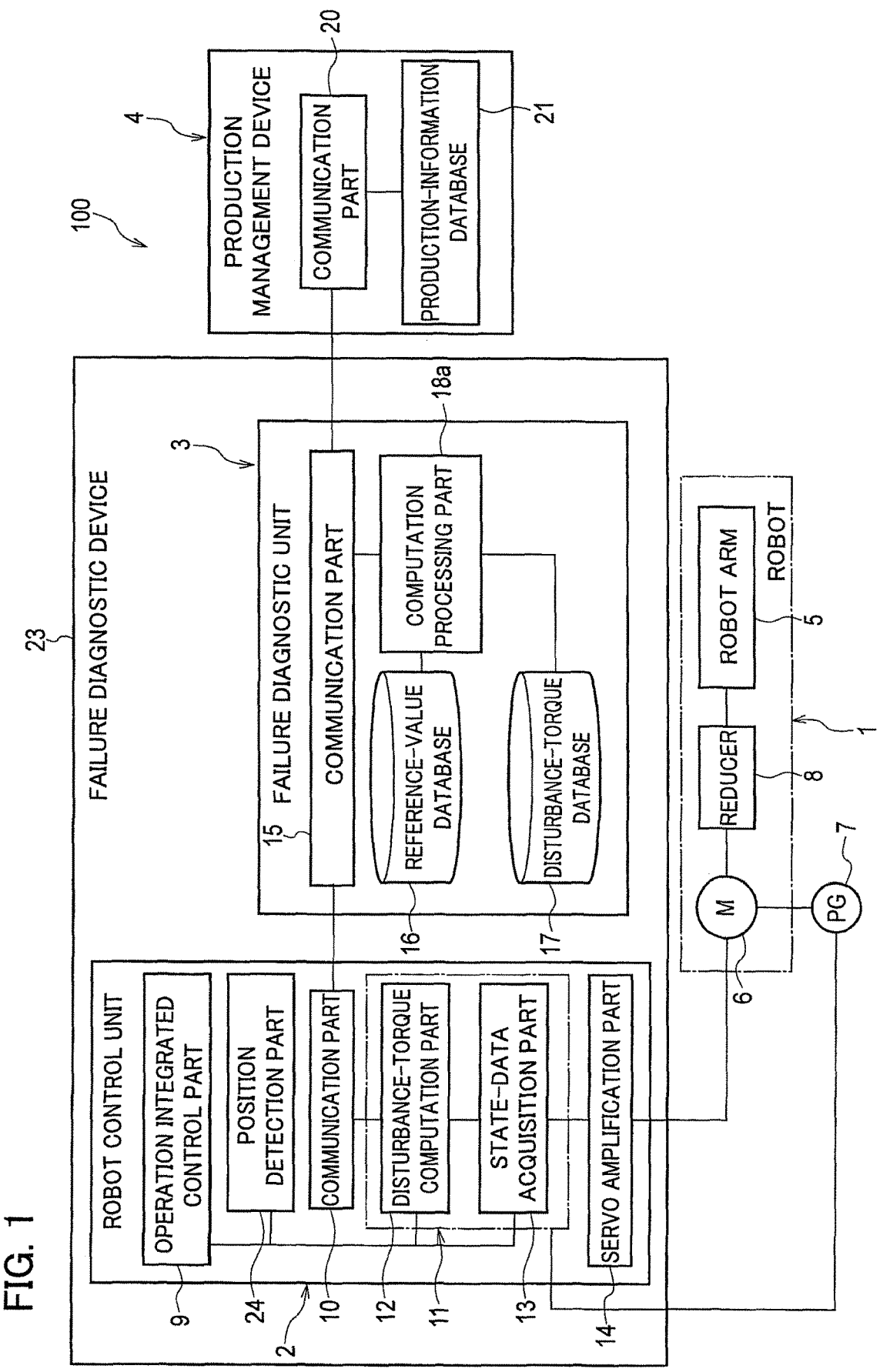
FIG. 1 is a block diagram illustrating the overall configuration of a failure diagnostic system 100 including a failure diagnostic device 23 according to a first embodiment.

Embodiments of the present invention will now be described with reference to the drawings. Similar portions illustrated in the drawings will be denoted by identical reference signs, and description thereof will be omitted. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

The overall configuration of a diagnostic system 100 including a failure diagnostic device 23 according to a first embodiment will be described with reference to FIG. 1. The failure diagnostic system 100 is formed of a robot 1, a failure diagnostic device 23, and a production management device 4. The failure diagnostic device 23 includes a robot control unit 2 and a failure diagnostic unit 3.

The robot 1 is a multi-axis-machine teaching-playback robot as an example of a multi-axis robot. The robot 1 includes motor drive systems as joint shafts being operation shafts. The robot arm 5 is driven by a servomotor (hereinafter simply referred to as the motor) 6 through a reducer 8. To the motor 6 is attached a pulse coder (pulse generator or encoder) 7 being a component for detecting its rotational angle position and speed.

The robot control unit 2 includes an operation integrated control part 9, a position detection part 24, a communication part 10, a servo control part 11 (an example of a torque detection part), and a servo amplification part 14. The servo control part 11 drives the motor 6 through the servo amplification part 14 upon receipt of a command from the higher-level operation integrated control part 9. The pulse coder 7, attached to the motor 6, forms a feedback loop for a process of controlling the rotational angle position and speed of the motor 6 between itself and the servo control part 11.

The servo control part 11 includes a processor that performs a process of controlling the rotational angle position, speed, and current of the motor 6, an ROM that stores a control program, and a non-volatile storage that stores preset values and various parameters. The servo control part 11 also includes an RAM that temporarily stores data during a computation process, a register that counts position feedback pulses from the pulse coder 7 to detect the absolute rotational angle position of the motor 6, and so on.

The servo control part 11 forms circuitry that detects disturbance torques (Tq) applied to the joint shafts by causing the processor to execute a pre-installed computer program. The servo control part 11 includes a disturbance-torque computation part 12 and a state-data acquisition part 13 as the above circuitry.

The state-data acquisition part 13 regularly collects various data on the state of actuation of each joint shaft of the robot 1 (data indicating the rotational angle position, the speed, and the current). The disturbance-torque computation part 12 computes the disturbance torque (Tq) based on the data acquired by the state-data acquisition part 13. The disturbance torque (Tq), computed by the disturbance-torque computation part 12, is outputted to the failure diagnostic unit 3 through the communication part 10. With this configuration, the servo control part 11 is in the form of what is called a software servo. Note that details of a method of calculating the disturbance torque (Tq) will be described later with reference to FIG. 2. The disturbance torque (Tq) refers to the difference between a torque command value for the motor 6 and the torque generated by the motor 6.

Note that motor drive systems as the one in FIG. 1 are required as many as the joint shafts included in the robot 1. However, in FIG. 1, only the motor drive system for one shaft is illustrated, and illustration of the other motor drive systems is omitted. Also, a speed-change gear train is interposed between the motor 6 and the reducer 8 in FIG. 1 in some cases.

The position detection part 24 detects the movement position of the joint shaft provided with the motor 6 from the absolute rotational angle position of the motor 6 acquired by the state-data acquisition part 13. Data indicating the movement position of the joint shaft, detected by the position detection part 24, is outputted to the failure diagnostic unit 3 through the communication part 10 in association with data indicating the disturbance torque (Tq). The information on the movement position of the joint shaft and the disturbance torque, which are associated with each other, is transferred to the failure diagnostic unit 3.

Situated in a higher level than the servo control part 11 and the position detection part 24, the operation integrated control part 9 has direct control of the operation of the robot 1. The communication part 10 exchanges necessary data with a communication part 15 of the failure diagnostic unit 3 to be described below through, for example, an LAN or the like.

The failure diagnostic unit 3 includes the communication part 15, a reference-value database 16, a disturbance-torque database 17, and a computation processing part 18a. The communication part 15 exchanges necessary data with the communication part 10 of the above-described robot control unit 2 and a communication part 20 of the production management device 4 through, for example, LANs or the like.

The disturbance-torque database 17 sequentially stores pieces of the data indicating the disturbance torques (Tq) associated with the movement positions of the joint shafts, which are transmitted from the robot control unit 2. Past disturbance torques (Tq) are accumulated in the disturbance-torque database 17.

The computation processing part 18a actively executes a failure diagnosis on the robot 1 based on the disturbance torques (Tq) stored in the disturbance-torque database 17. The computation processing part 18a is equipped with a memory function, and temporarily stores data acquired by accessing the disturbance-torque database 17 and executes a failure diagnosis based on these data. Details of the computation processing part 18a will be described later with reference to FIG. 3.

The production management device 4 is a device that manages production information including, for example, the operational situations of production lines in a factory, and the like, and includes the communication part 20 and a production-information database 21. The communication part 20 exchanges necessary data with the communication part 15 of the failure diagnostic unit 3 through, for example, an LAN or the like. The production-information database 21 has a function of storing various pieces of production information collected. Thus, various previous pieces of production information are accumulated in the production-information database 21. Note that the pieces of production information include information on emergency stop of the robot 1 and accompanying equipment, information on maintenance records, and the like.

Figure 2:
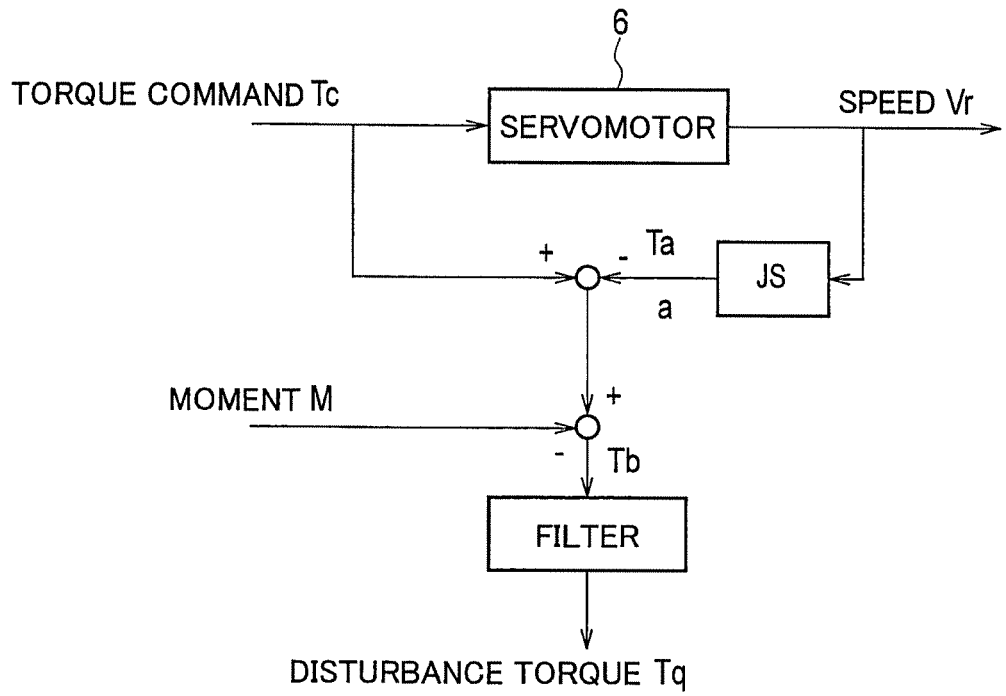
FIG. 2 is a block diagram illustrating details of a method of calculating a disturbance torque (Tq).

An example of the method of calculating a disturbance torque (Tq) will be described with reference to FIG. 2. The disturbance-torque computation part 12 differentiates an actual speed Vr of the motor 6 calculated from a speed feedback signal from the pulse coder 7 to calculate the acceleration. The disturbance-torque computation part 12 multiplies this acceleration by all inertias J applied to the motor 6 to calculate an acceleration torque Ta. Then, the disturbance-torque computation part 12 subtracts the acceleration torque Ta from a torque command Tc for the motor 6 calculated with a speed loop process by the servo control part 11. From the value resulting from the subtraction, a moment M is further subtracted to calculate a disturbance torque Tb. Thereafter, a predetermined filtering process is performed to remove disturbance irregular components to obtain a "disturbance torque (Tq)." By causing the servo control part 11 to execute such processing at predetermined sampling intervals, disturbance torques (Tq) can be sequentially detected.

More specifically, the servo control part 11 includes a register, and this register finds the absolute position of the motor 6 by counting position feedback pulses from the pulse coder 7 at predetermined sampling intervals. Thus, the servo control part 11 detects the absolute position of the motor 6 by means of the register and, from the absolute position of the motor 6, finds the rotational angle position (movement position) of the joint shaft driven by the motor 6. Further, the servo control part 11 performs the processing in FIG. 2 as described above to calculate the disturbance torque (Tq).

Figure 3:
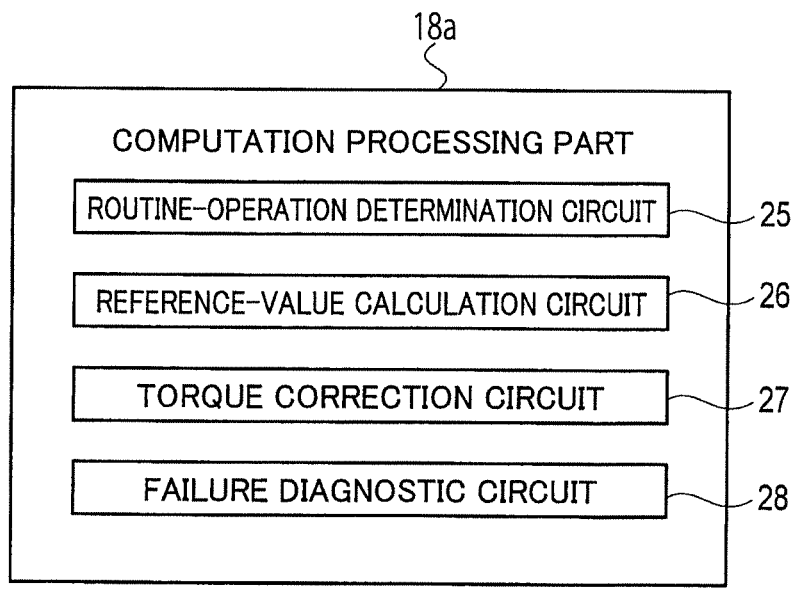
FIG. 3 is a block diagram illustrating details of a computation processing part 18a in FIG. 1.

Details of the computation processing part 18a will be described with reference FIG. 3. The computation processing part 18a includes a microprocessor and forms a series of computation processing circuits for performing a failure diagnosis on the robot 1 based on its disturbance torques by executing a pre-installed program. The computation processing part 18a includes a routine-operation determination circuit 25, a reference-value calculation circuit 26, a torque correction circuit 27, and a failure diagnostic circuit 28 as the series of computation processing circuits.

The routine-operation determination circuit 25 determines whether or not the robot 1 is executing a predefined routine operation, from the movement positions of the joint shafts detected by the position detection part 24. The "routine operation" refers to an operation among the operations executed by the robot 1 the content of which is common among a plurality of robots. For example, the routine operation can be a grinding operation of grinding a weld gun's gun tip to refresh it. The movement positions of the joint shafts of the robot 1 at the time of executing this grinding operation have been defined in advance. Thus, the routine-operation determination circuit 25 can determine whether or not the robot 1 is executing the predefined routine operation, from the movement positions of the joint shafts detected by the position detection part 24. The routine-operation determination circuit 25 reads the data on the movement positions of the joint shafts associated with the disturbance torques from the disturbance-torque database 17, and determines whether or not the routine operation is being executed from the movement positions of the joint shafts.

The reference-value calculation circuit 26 calculates disturbance-torque reference values from each disturbance torque (Tq) detected during the execution of the routine operation. The reference-value calculation circuit 26 reads the disturbance torques associated with the movement positions of the joint shafts determined as executing the routine operation from the disturbance-torque database 17. From each disturbance torque (Tq) thus read, the reference-value calculation circuit 26 calculates a representative value of the disturbance torque (Tq) and an amount of change in the disturbance torque (Tq) as disturbance-torque reference values. The representative value of the disturbance torque (Tq) can be the average, median, or integral of the disturbance torque (Tq) detected during the execution of the routine operation. The amount of change in the disturbance torque (Tq) can be the variance, deviation, standard deviation, or difference between the largest value and the smallest value of the disturbance torque (Tq) detected during the execution of the routine operation.

The torque correction circuit 27 corrects a disturbance torque (Tq) by using the disturbance-torque reference values, calculated by the reference-value calculation circuit 26. The disturbance torque (Tq) to be corrected is a disturbance torque detected during the execution of the routine operation. The disturbance torque (Tq) thus corrected will be referred to as a corrected disturbance torque (Tq'). The torque correction circuit 27 acquires a corrected disturbance torque (Tq') by subtracting the representative value from the disturbance torque (Tq) detected during the execution of the routine operation and dividing the value resulting from the subtraction by the amount of change. The torque correction circuit 27 can acquire a corrected disturbance torque (Tq') standardized between a plurality of robots 1 that execute the operation.

The failure diagnostic circuit 28 performs a failure diagnosis on the robot 1 by comparing each corrected disturbance torque (Tq'), acquired by the torque correction circuit 27, and a threshold ($\alpha$). Specifically, the failure diagnostic circuit 28 can determine that the robot 1 is experiencing a failure if the corrected disturbance torque (Tq') is greater than the threshold ($\alpha$). In the first embodiment, the threshold ($\alpha$) is a value unique to the predefined routine operation, and is a value fixed regardless of which robot 1 executes this routine operation. Since the corrected disturbance torque (Tq') is a value standardized between a plurality of robots 1, the threshold ($\alpha$) does not vary from one robot 1 to another.

A specific example of the standardization of a disturbance torque (Tq) via correction will be described with reference to FIGS. 4(a)-4(b) and 5(a)-5(b). FIGS. 4(a)-4(b) illustrate a specific example of a case where the representative value is the average of the disturbance torque (Tq) and the amount of change is the standard deviation of the disturbance torque (Tq). FIG. 4(a) illustrates time-series changes in disturbance torques (Tqa, Tqb) of two robots 1 executing the routine operation. Since the robots 1 are different entities, the disturbance torques (Tqa, Tqb) detected differ greatly even when they execute the same routine operation. Specifically, the difference between the disturbance torques (Tqa, Tqb) can be expressed with averages (RPa, RPb) and standard deviations (VQa, VQb) of the disturbance torques (Tqa, Tqb). Thus, for example, for the disturbance torque (Tqa), equation (1) is used to calculate a corrected disturbance torque (Tqa'). A corrected disturbance torque (Tqb') is calculated in a similar manner. Consequently, as illustrated FIG. 4(b), the corrected disturbance torques (Tqa', Tqb'), which are standardized between the robots 1, can be acquired.

$$Tqa'=(Tqa-RPa)/VQa \quad (1)$$

By comparing the absolute values of the corrected disturbance torques (Tqa', Tqb') and the threshold ($\alpha$), the failure diagnostic circuit 28 can perform failure diagnoses.

FIGS. 5(a)-5(b) illustrate a specific example of a case where the representative value is the smallest value (mi) of the disturbance torque (Tq) and the amount of change is the difference (VQa, VQb) between the largest value (Ma) and the smallest value (mi) of the disturbance torque (Tq). In this case too, the torque correction circuit 27 can correct the disturbance torque (Tq) by using equation (1). The corrected disturbance torques (Tqa', Tqb') in FIGS. 5(a)-5(b) differ from those in FIGS. 4(a)-4(b) in that they are standardized between 0 and 1. The disturbance torques (Tqa, Tqb) in FIG. 5(a) are the same as those in FIG. 4(a).

Figure 6:
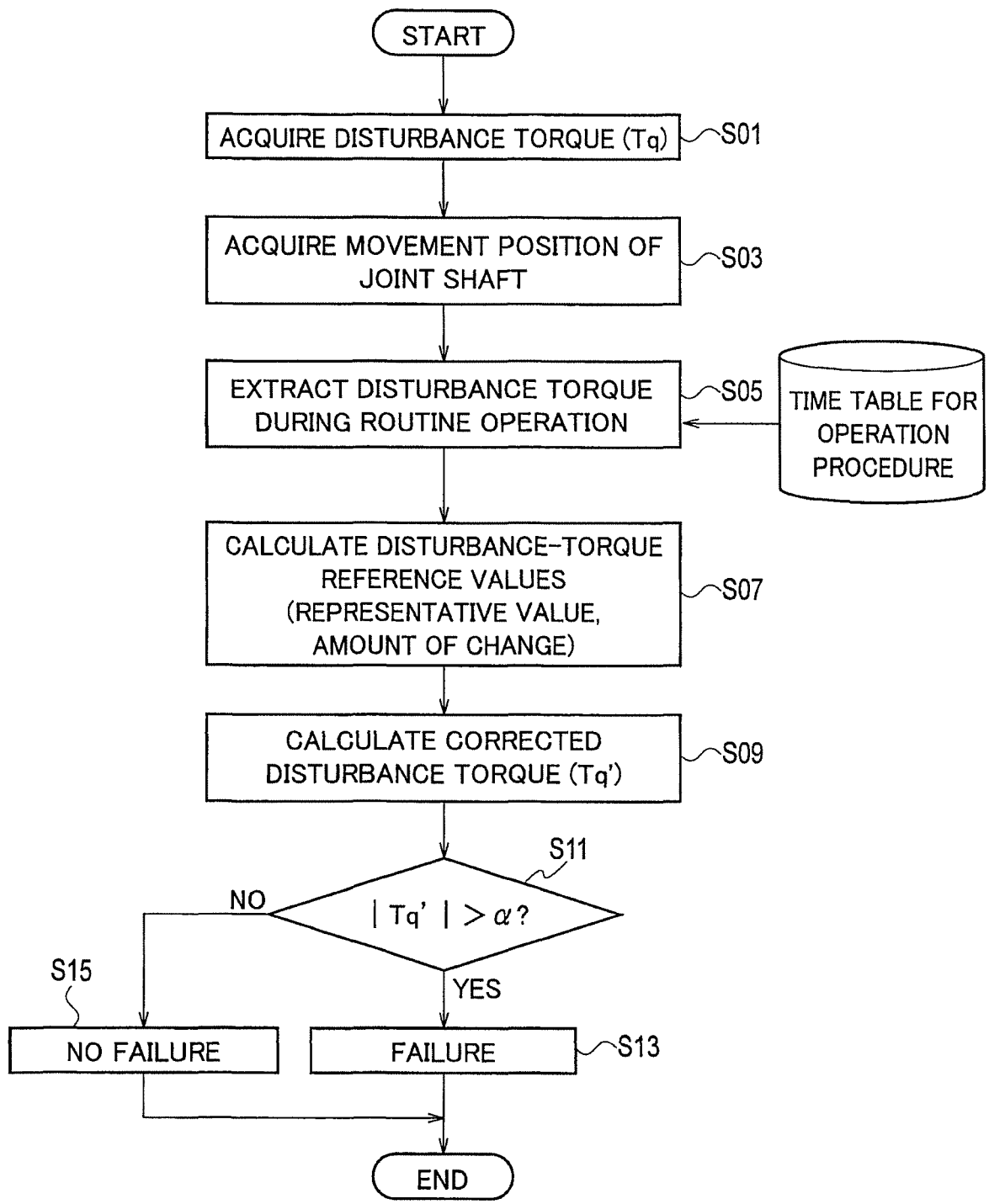
FIG. 6 is a flowchart illustrating a failure diagnostic method according to the first embodiment.

A failure diagnostic method according to the first embodiment will be described with reference to a flowchart in FIG. 6. The failure diagnostic method according to the first embodiment is executed using the failure diagnostic device 23 in FIG. 1.

In step S01, the state-data acquisition part 13 collects various data on the state of actuation of each joint shaft of the robot 1 (data indicating the rotational angle position, the speed, and the current), and the disturbance-torque computation part 12 computes the disturbance torque (Tq) based on the data acquired by the state-data acquisition part 13. The disturbance torque (Tq), computed by the disturbance-torque computation part 12, is outputted to the failure diagnostic unit 3 through the communication part 10.

In step S03, the position detection part 24 detects the movement position of the joint shaft provided with the motor 6 from the absolute rotational angle position of the motor 6 acquired by the state-data acquisition part 13 so as to link the movement position to the disturbance torque (Tq) acquired in step S01.

In step S05, the routine-operation determination circuit 25 determines whether or not the robot 1 is executing a predefined routine operation, from the movement position of the joint shaft detected by the position detection part 24. Here, the routine-operation determination circuit 25 may instead determine the timing to execute the routine operation by acquiring an operation time schedule for the operation procedure from the production-information database 21. The reference-value calculation circuit 26 extracts the disturbance torque (Tq) detected during the execution of the routine operation.

Figure 4:
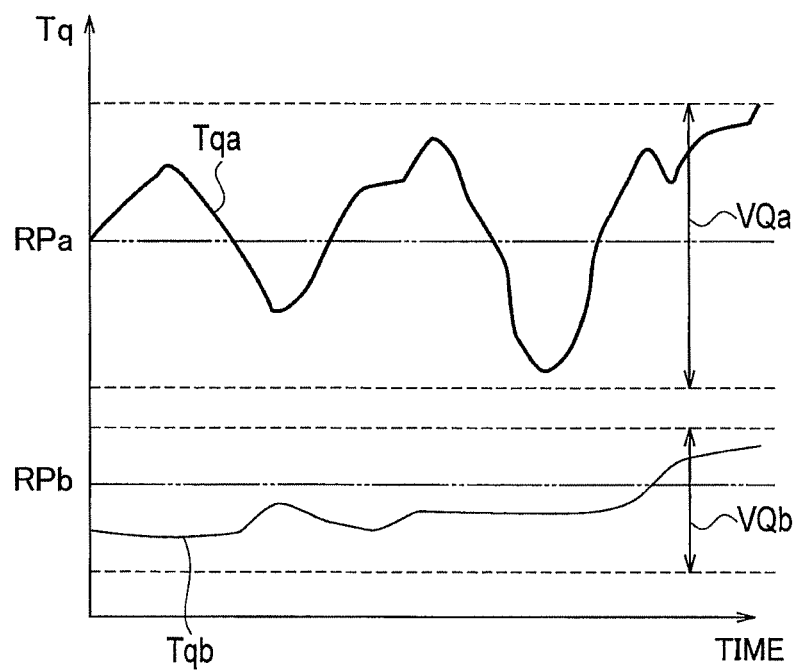
FIG. 4(a) is a graph illustrating time-series changes in disturbance torques (Tqa, Tqb)
FIG. 4(b) is a graph illustrating corrected disturbance torques (Tqa', Tqb') in a case where a representative value is the average of the disturbance torque (Tq) and an amount of change is the standard deviation of the disturbance torque (Tq).
Figure 4:
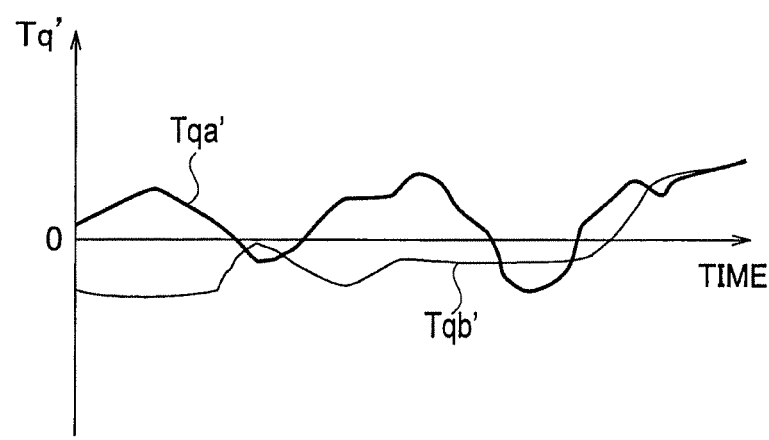

The method proceeds to step S07, in which, from the extracted disturbance torque (Tq), the reference-value calculation circuit 26 calculates the representative value of the disturbance torque (Tq) and the amount of change in the disturbance torque (Tq) as disturbance-torque reference values. The method proceeds to step S09, in which the torque correction circuit 27 corrects the disturbance torque (Tq) by using the disturbance-torque reference values, calculated by the reference-value calculation circuit 26, as illustrated in FIGS. 4(*a*)-4(*b*) and 5(*a*)-5(*b*). Specifically, the torque correction circuit 27 subtracts the representative value from the disturbance torque (Tq) detected during the execution of the routine operation and divides the value resulting from the subtraction by the amount of change to thereby acquire a corrected disturbance torque (Tq'). The torque correction circuit 27 can acquire a corrected disturbance torque (Tq') standardized between a plurality of robots 1.

The method proceeds to step S11, in which the failure diagnostic circuit 28 determines whether or not the corrected disturbance torque (Tq') is greater than the threshold (α). If the corrected disturbance torque (Tq') is greater than the threshold (α) (YES in step S11), the method proceeds to step S13, in which the failure diagnostic circuit 28 determines that the robot 1 is experiencing a failure. If the corrected disturbance torque (Tq') is less than or equal to the threshold (α) (NO in step S11), the method proceeds to step S15, in which the failure diagnostic circuit 28 determines that the robot 1 is not experiencing any failure. The flowchart in FIG. 6 is implemented as above regularly to perform a failure diagnosis.

As described above, the first embodiment may achieve one or more of the following advantageous effects.

Since there are individual differences between a plurality of robots, the disturbance torque (Tq) can differ from one robot to another even when they execute the same operation. Even in this case, disturbance-torque reference values are calculated based on the disturbance torque (Tq) detected during execution of a predefined routine operation, and the disturbance torque during the execution of the routine operation is corrected using the disturbance-torque reference values. This makes it possible to perform an accurate failure diagnosis using a fixed threshold regardless of the individual differences between robots. In other words, it is no longer necessary to set a different threshold for each robot. Further, standardization is likewise possible for the plurality of joint shafts included in a single robot.

In the case where the same robot executes a plurality of operations with different contents, it has been necessary to set a different threshold for each operation as a threshold for performing a failure diagnosis on the robot. To solve this, disturbance-torque reference values are calculated from the disturbance torque (Tq) detected during execution of a predefined routine operation, and the disturbance torque during an operation different from the routine operation is corrected using the disturbance-torque reference values. In this way, it is possible to obtain a corrected disturbance torque (Tq') standardized between a plurality of different operations. Thus, a fixed threshold can be set regardless of the contents of the operations. In other words, it is no longer necessary to set a different threshold for each operation.

The reference-value calculation circuit 26 calculates the representative value of the disturbance torque (Tq) and the amount of change in the disturbance torque (Tq) as the disturbance-torque reference values. The torque correction circuit 27 acquires a corrected disturbance torque (Tq') by subtracting the representative value from the disturbance torque (Tq) and dividing the value resulting from the subtraction by the amount of change. Thus, the representative value addresses the difference in absolute value of the disturbance torque, and the amount of change addresses the difference in range of variation of the disturbance torque. Hence, it is possible to obtain a corrected disturbance torque (Tq') standardized between a plurality of different robots, joint shafts, or operations.

As illustrated in FIGS. 4(*a*)-4(*b*), the representative value may be the average (RPa, RPb) of the disturbance torque detected during execution of a routine operation, and the amount of change may be the standard deviation (VQa, VQb) of the disturbance torque detected during the execution of the routine operation. In this way, it is possible to perform an accurate failure diagnosis using a fixed threshold.

Figure 5:
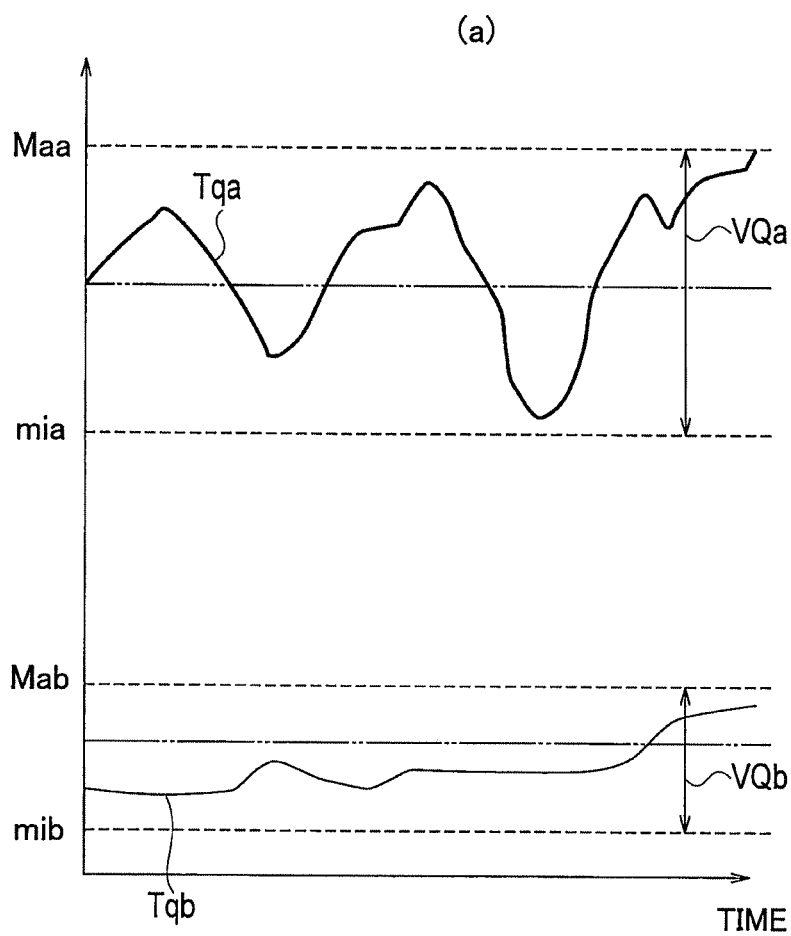
FIG. 5(a) is a graph illustrating time-series changes in the disturbance torques (Tqa, Tqb), which is the same as FIG. 4(a)
FIG. 5(b) is a graph illustrating the corrected disturbance torques (Tqa', Tqb') in a case where the representative value is the smallest value of the disturbance torque (Tq) and the amount of change is the difference between the largest value and the smallest value of the disturbance torque (Tq).
Figure 5:
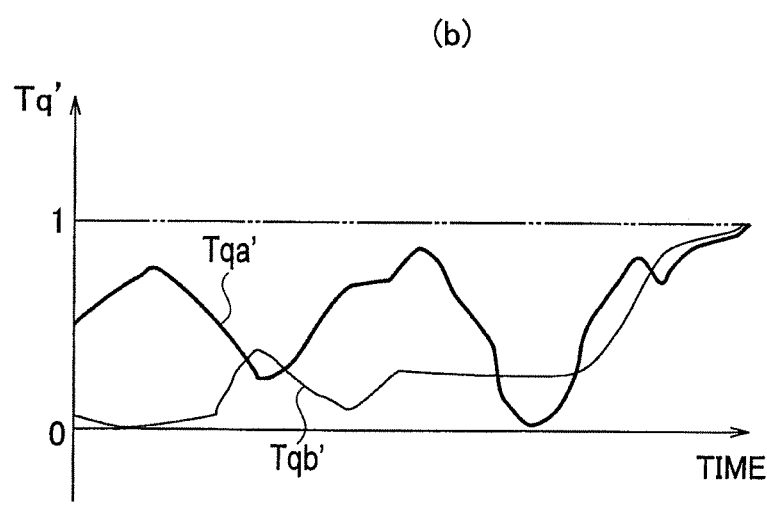

As illustrated in FIGS. 5(*a*)-5(*b*), the representative value may be the smallest value (mia, mib) of the disturbance torque detected during execution of a routine operation, and the amount of change may be the difference (VQa, VQb) between the largest value and the smallest value of the disturbance torque detected during the execution of the routine operation. In this way, standardization is possible in the range of 0 to 1, and the threshold (α) can be fixed at one value. This makes it possible to perform an accurate failure diagnosis using a fixed threshold.

Second Embodiment

Figure 13:
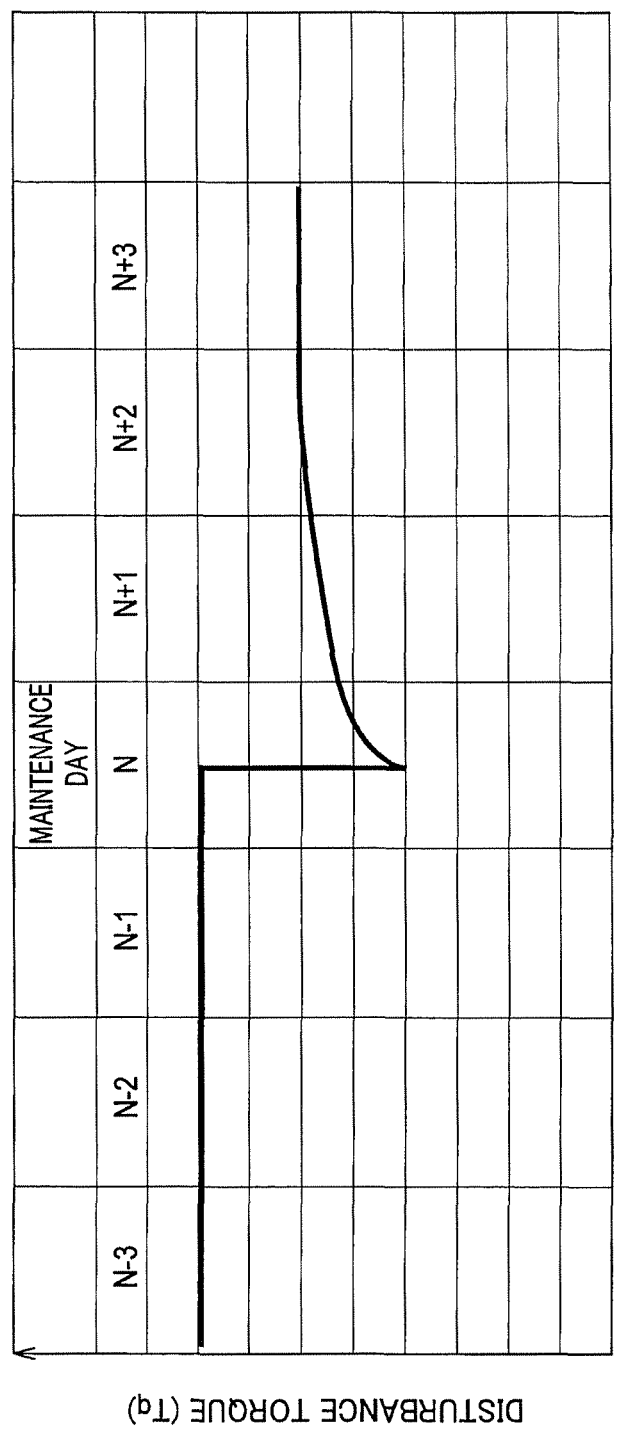
FIG. 13 is a graph illustrating an example where the disturbance torque (Tq) greatly decreases due to implementation of repair or maintenance.

Depending on the status of implementation of repair or maintenance on a robot 1, its disturbance torque may greatly vary. For example, a detected disturbance torque (Tq) gradually increases due to aged deterioration of the robot 1. However, by implementing repair or maintenance to renew the lubricating oil of the robot 1, the detected disturbance torque (Tq) may greatly decrease as illustrated in FIG. 13. Thus, it is possible to perform a more accurate failure diagnosis by taking into account the status of implementation of repair or maintenance.

Figure 7:
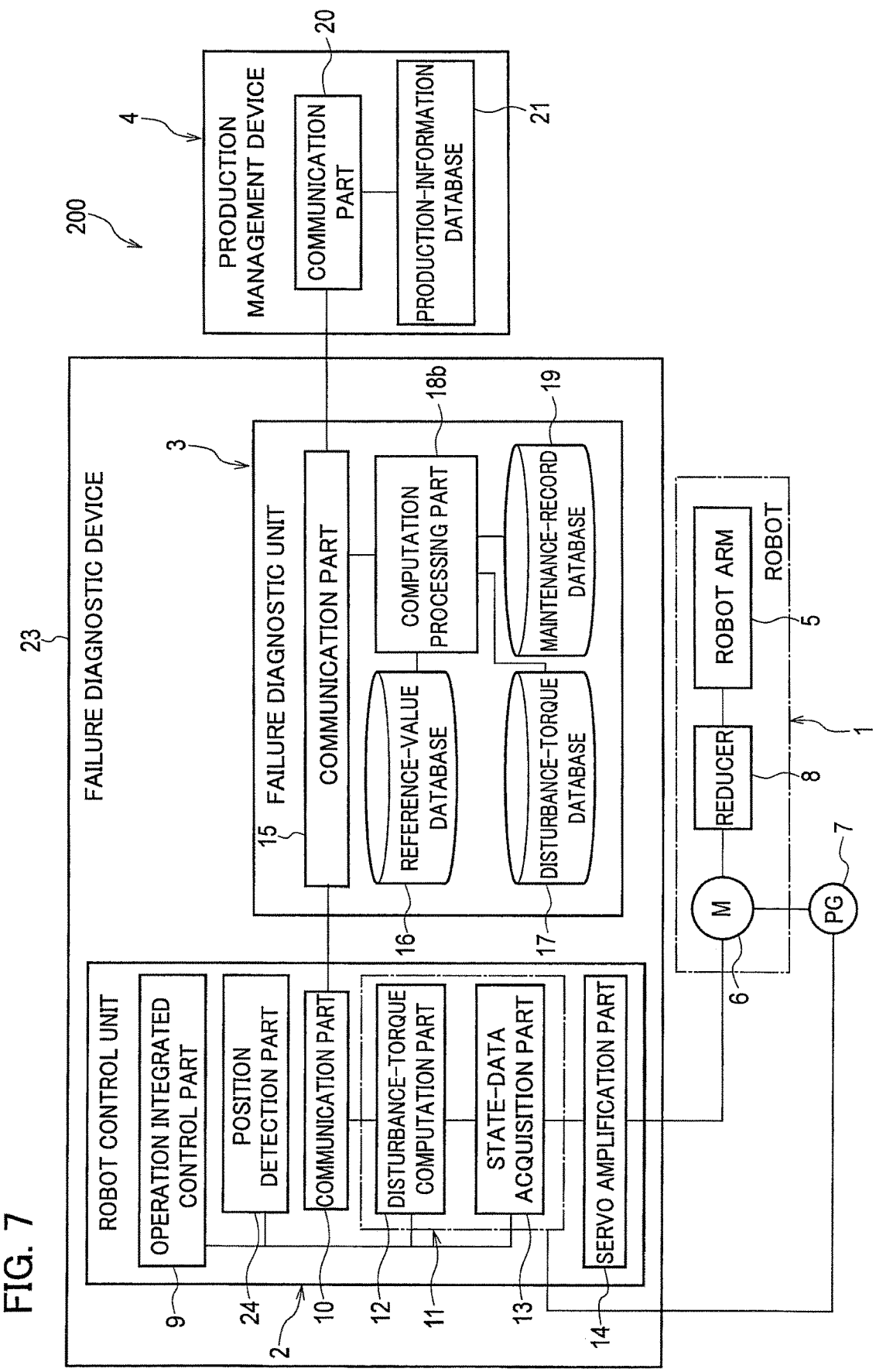
FIG. 7 is a block diagram illustrating the overall configuration of a failure diagnostic system 200 including a failure diagnostic device 23 according to a second embodiment.

The overall configuration of a failure diagnostic system 200 including a failure diagnostic device 23 according to a second embodiment will be described with reference to FIG. 7. The failure diagnostic system 200 is formed of a robot 1, the failure diagnostic device 23, and a production management device 4. The failure diagnostic system 200 differs from FIG. 1 in that its failure diagnostic unit 3 further includes a maintenance-record database 19 and that its computation processing part 18*b* has a different circuit configuration. Beside these, the failure diagnostic system 200 is similar to FIG. 1.

The maintenance-record database 19 stores information on the status of implementation of repair or maintenance on the robot 1 for each robot and each joint shaft. Past maintenance record data are accumulated in the maintenance-record database 19.

Figure 8:
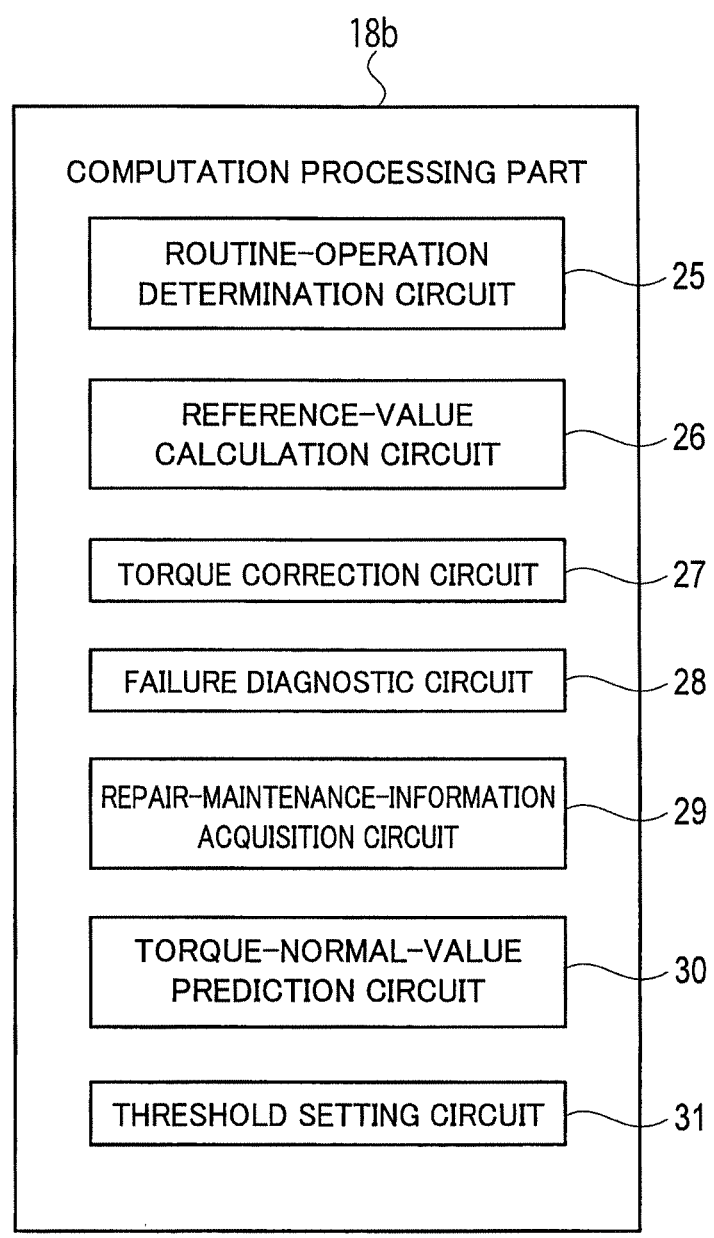
FIG. 8 is a block diagram illustrating details of a computation processing part 18b in FIG. 7.

Details of the computation processing part 18*b* in FIG. 7 will be described with reference to FIG. 8. The computation processing part 18*b* differs from the computation processing part 18*a* in FIG. 3 in that the computation processing part 18*a* further includes a repair-maintenance-information acquisition circuit 29, a torque-normal-value prediction circuit 30, and a threshold setting circuit 31.

The repair-maintenance-information acquisition circuit 29 acquires information on the status of implementation of repair or maintenance on the robot 1 from the maintenance-record database 19. The torque-normal-value prediction circuit 30 predicts a disturbance-torque normal value, which is the disturbance torque at a time when the robot 1 operates normally, by taking into account the information acquired by the repair-maintenance-information acquisition circuit 29. The threshold setting circuit 31 sets a threshold ($\alpha$) based on the disturbance-torque normal value, predicted by the torque-normal-value prediction circuit 30.

Figure 9:
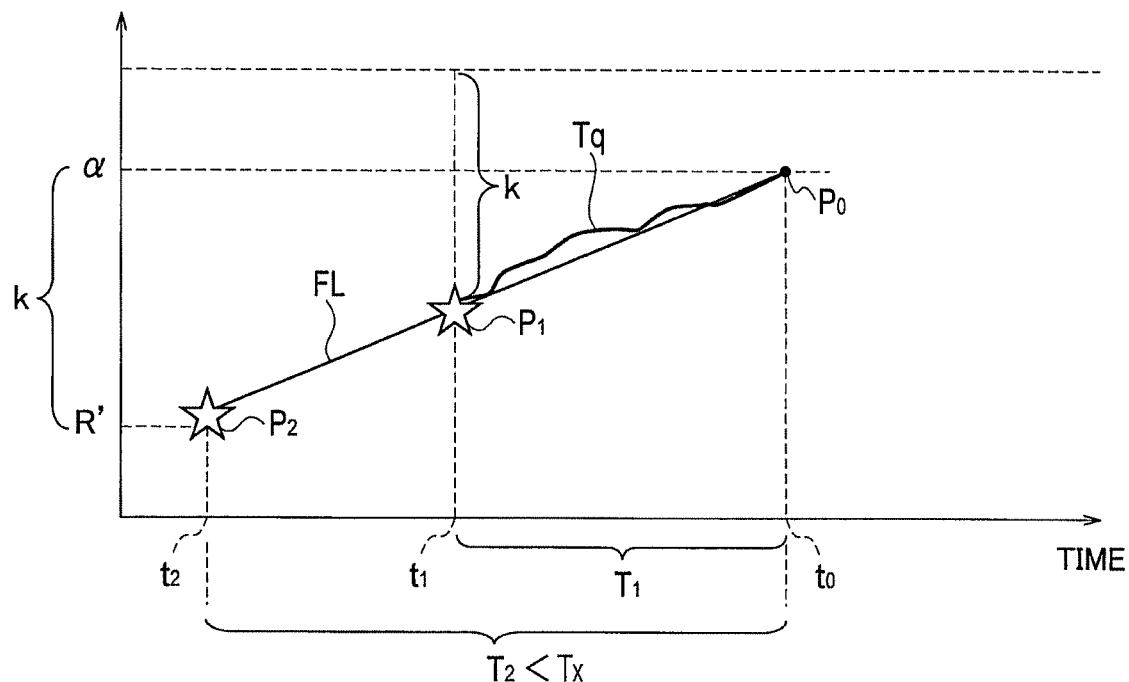
FIG. 9 is a graph explaining a method of predicting a disturbance-torque normal value (R') without a seasonal fluctuation component taken into account.

The torque-normal-value prediction circuit 30 predicts the disturbance-torque normal value based on data on the disturbance torque (Tq) acquired during a predefined period (first period). FIG. 9 illustrates the disturbance torque (Tq) acquired during the first period ($T_1$). The torque-normal-value prediction circuit 30 reads the data on the disturbance torque (Tq) from the disturbance-torque database 17. Then, the torque-normal-value prediction circuit 30 predicts a disturbance-torque normal value (R') by using a regression equation with the time-series change in the disturbance torque (Tq) acquired during the first period ($T_1$). The first period ($T_1$) is, for example, one to three months. The disturbance-torque normal value (R') may of course be predicted by using a disturbance torque (Tq) acquired through a longer period than the first period ($T_1$).

For example, using the method of least squares, the torque-normal-value prediction circuit 30 can approximate the disturbance torque (Tq) acquired during the first period ($T_1$) with a straight line (FL) to find a model equation for the disturbance torque.

In a case where repair or maintenance was implemented or the robot 1 was installed in a second period (Tx) preceding a failure diagnosis time ($t_0$), the torque-normal-value prediction circuit 30 predicts the disturbance-torque normal value (R') while assuming the time immediately after implementing the repair or maintenance ($t_2$) or installing the robot 1 as the time when the robot 1 operates normally. The second period (Tx) is, for example, one year.

Although illustration is omitted, in a case where the repair or maintenance was implemented or the robot 1 was installed one year or more before the failure diagnosis time ($t_0$), it is difficult to accurately predict the disturbance-torque normal value (R') at the time when the repair or maintenance was implemented or a like time. For example, a seasonal fluctuation component contained in the disturbance torque (Tq) cannot be ignored. The torque-normal-value prediction circuit 30 then predicts the disturbance-torque normal value (R') without the seasonal fluctuation component taken into account with the period limited up to the second period (Tx) preceding the failure diagnosis time ($t_0$). The disturbance-torque normal value (R) may of course be predicted with the seasonal fluctuation component taken into account even in the case where the time when the repair or maintenance was implemented was one year or less ago, in order to enhance the prediction accuracy.

Figure 10:
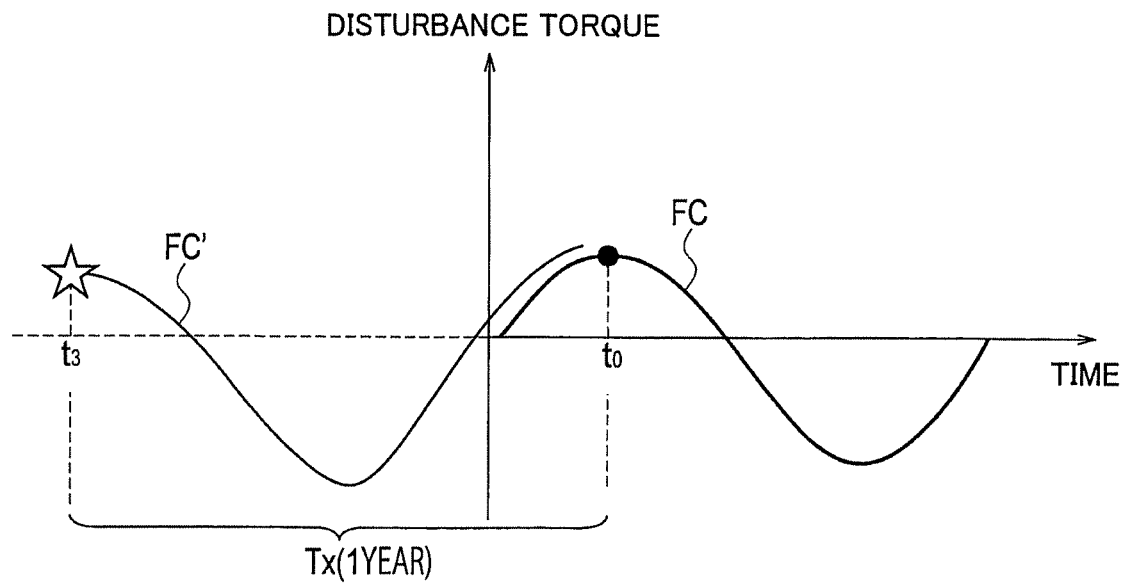
FIG. 10 is a graph explaining approximation of the seasonal fluctuation component, present in a disturbance torque, with a sinusoidal wave.

In a case where repair or maintenance was not implemented in the second period (Tx) preceding the failure diagnosis time ($t_0$), the torque-normal-value prediction circuit 30 predicts the disturbance-torque normal value (R') with the seasonal fluctuation component present in the disturbance torque (Tq) taken account. As illustrated in FIG. 10, the torque-normal-value prediction circuit 30 predicts the disturbance-torque normal value (R') while assuming a past time ($t_3$) coinciding in seasonal fluctuation (FC, FC') with the failure diagnosis time ($t_0$) as the time when the robot 1 operates normally. For example, the seasonal fluctuation component (FC, FC'), present in the disturbance torque (Tq), can be approximated with a sinusoidal wave ($c \times \sin(2\pi t)$) having a period of one year. If the failure diagnosis time ($t_0$) is summer or winter, the past time ($t_3$), coinciding therewith in seasonal fluctuation, is the summer or winter one year (Tx) ago. Meanwhile, if the failure diagnosis time ($t_0$) is spring or fall, the past point ($t_3$), coinciding therewith in seasonal fluctuation, may be the fall or spring half a year (Tx/2) ago.

Specifically, as illustrated in FIG. 10, the torque-normal-value prediction circuit 30 approximates the seasonal fluctuation component of the disturbance torque (Tq) acquired during the first period ($T_1$) with a sinusoidal wave (FC). The torque-normal-value prediction circuit 30 creates a sinusoidal wave (FC') by extending the sinusoidal wave (FC) to a past point that is one year (Tx) or half a year ago. In this way, the torque-normal-value prediction circuit 30 can predict the disturbance torque at the past time ($t_3$), coinciding in seasonal fluctuation (FC, FC') with the failure diagnosis time ($t_0$). In other words, the seasonal fluctuation component can be removed from the disturbance torque (Tq).

The torque-normal-value prediction circuit 30 approximates the aged deterioration component of the disturbance torque (Tq) acquired during the first period ($T_1$) with a straight line (FL) as in FIG. 9, while approximating the seasonal fluctuation component of the disturbance torque (Tq) with a sinusoidal wave. By combining the approximated straight line (FL) and sinusoidal wave, the function (FCL) given in equation (2) can be obtained. The torque-normal-value prediction circuit 30 sets the coefficients (a, b, c) of equation (2) by a non-linear regression method.

$$FCL = a \times t + b + c \times \sin(2\pi t) \tag{2}$$

Then, the torque-normal-value prediction circuit 30 calculates the disturbance torque in the second period (Tx) preceding the failure diagnosis time ($t_0$) as a disturbance-torque normal value (R').

The threshold setting circuit 31 sets a threshold ($\alpha$) based on the disturbance-torque normal value (R'), predicted by the torque-normal-value prediction circuit 30. Specifically, it is possible to determine that a failure has occurred if a disturbance torque ($P_0$) at the failure diagnosis time ($t_0$) has increased by a certain value (k) or more from the disturbance-torque normal value (R'), which is the disturbance torque at a time when the robot 1 was operating normally. Thus, the threshold setting circuit 31 sets a value obtained by adding the certain value (k) to the disturbance-torque normal value (R') as the threshold ($\alpha$). The certain value (k) is a common value among a plurality of robots 1.

Figure 11:
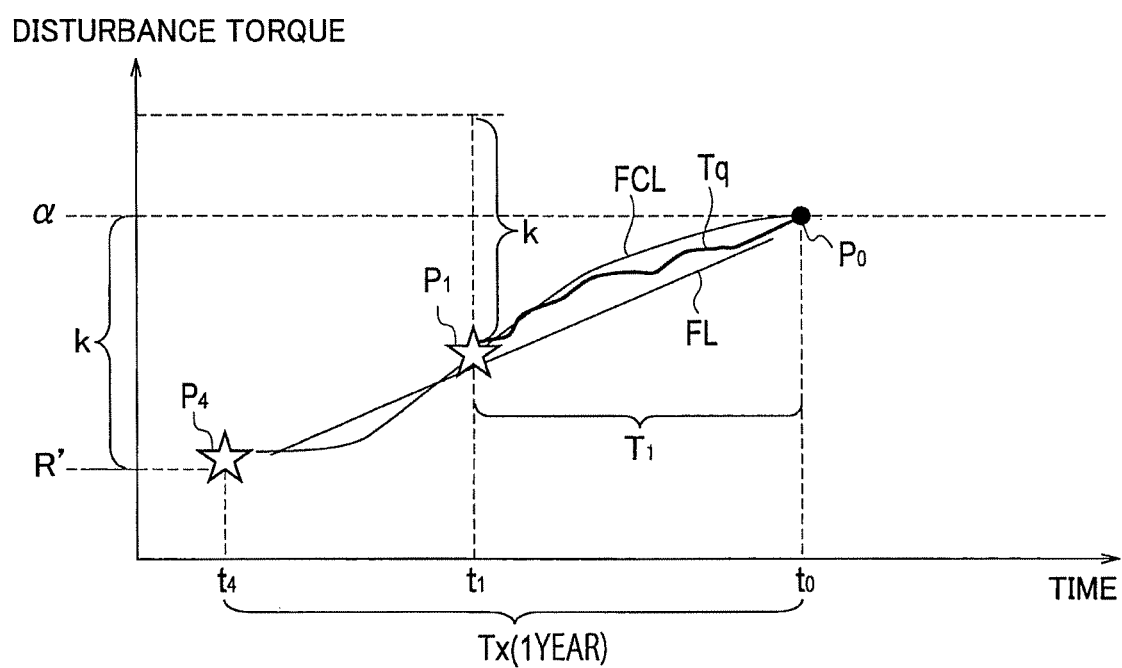
FIG. 11 is a graph explaining a method of predicting the disturbance-torque normal value (R') with the seasonal fluctuation component taken into account.
Figure 12:
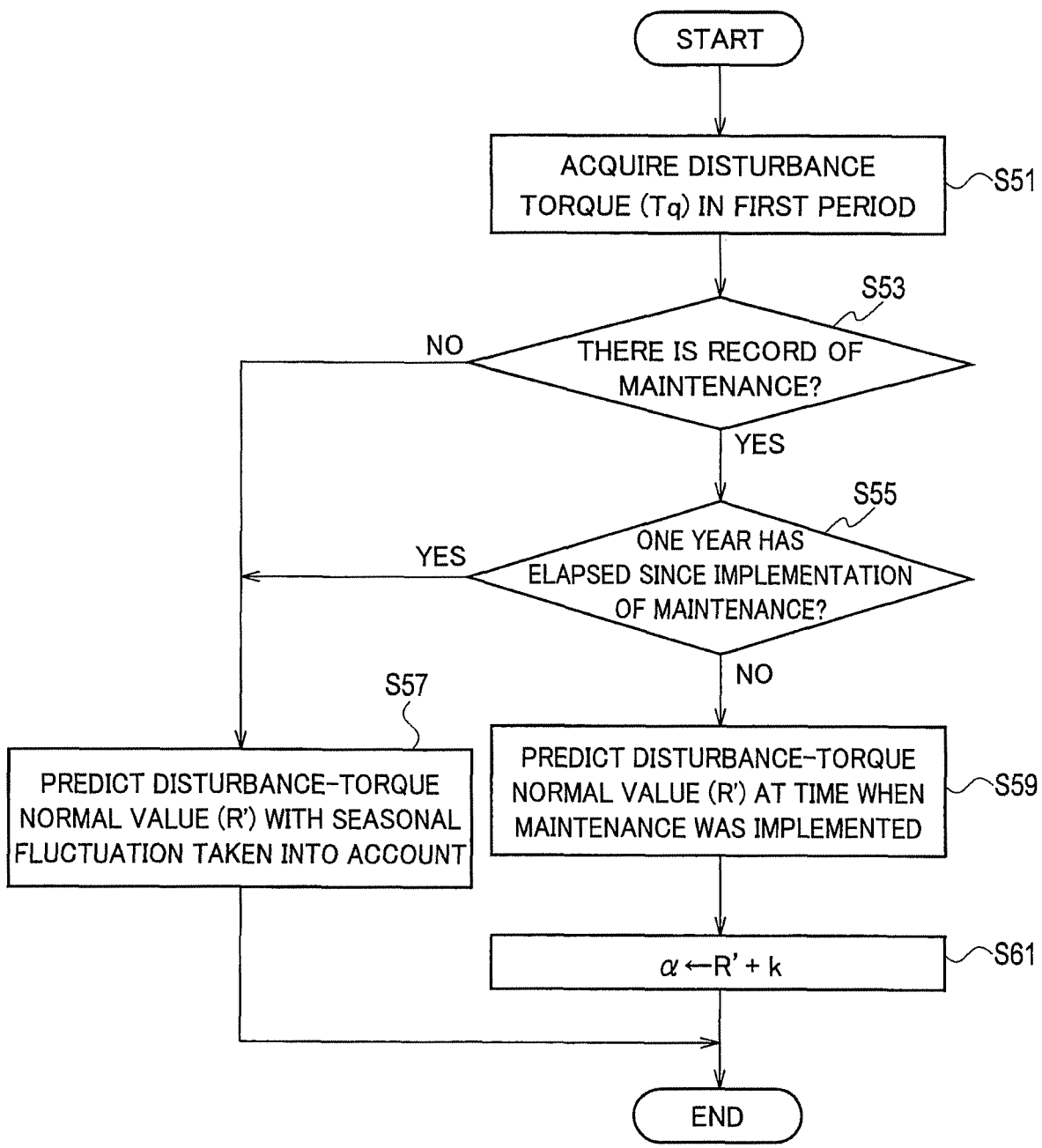
FIG. 12 is a flowchart illustrating an example of a method of setting a threshold ($\alpha$) in the second embodiment.

Next, a method of setting the threshold ($\alpha$) in the second embodiment will be described with reference to FIG. 12. In step S51, the torque-normal-value prediction circuit 30 reads the data on the disturbance torque (Tq) acquired during a predefined period (first period) from the disturbance-torque database 17. In step S53, the torque-normal-value prediction circuit 30 determines whether or not there is a record of implementation of repair or maintenance, based on the information on the status of implementation of repair or maintenance acquired by the repair-maintenance-information acquisition circuit 29. If there is a record of implementation (YES in S53), the method proceeds to step S55, in which the torque-normal-value prediction circuit 30 determines whether or not one year (second period) or more has elapsed since the implementation of the repair or maintenance. If one year or more has elapsed (YES in S55), it can be determined that it is difficult to accurately predict the disturbance torque at the time when the repair or maintenance was implemented. Thus, as in the case where there is no record of implementation (NO in S53), the method proceeds to step S57, in which the torque-normal-value prediction circuit 30 predicts the disturbance-torque normal value (R') with the seasonal fluctuation component taken into account, as illustrated in FIGS. 10 and 11.

On the other hand, if there is a record of implementation of repair or maintenance within one year before the failure diagnosis time (NO in S55), it can be determined that it is possible to predict the disturbance torque at the time when the repair or maintenance was implemented, without the seasonal fluctuation taken into account. Thus, the method proceeds to step S59, in which the torque-normal-value prediction circuit 30 predicts the disturbance-torque normal value (R') without the seasonal fluctuation component taken into account, as illustrated in FIG. 9.

The method proceeds to step S61, in which the threshold setting circuit 31 sets the value obtained by adding the certain value (k) to the predicted disturbance-torque normal value (R') as the threshold ($\alpha$). The determination process in step S11 in FIG. 6 is performed using the set threshold ($\alpha$).

As described above, the second embodiment may achieve one or more of the following advantageous effects.

Depending on the status of implementation of repair or maintenance on the robot 1, its disturbance torque (Tq) may greatly vary. For this reason, the disturbance-torque normal value (R') is predicted with the status of implementation of repair or maintenance taken into account, and the threshold ($\alpha$) is set based on the disturbance-torque normal value (R'). In this way, it is possible to perform a more accurate failure diagnosis taking into account the status of implementation of repair or maintenance.

As illustrated in FIGS. 9 to 11, the torque-normal-value prediction circuit 30 predicts the disturbance-torque normal value (R') based on the data on the disturbance torque (Tq) acquired during the first period ($T_1$). This makes it possible to accurately predict the disturbance-torque normal value (R'). For example, consider a comparative example where a disturbance torque ($P_1$) at a start point ($t_1$) of the first period ($T_1$) in FIG. 9 is predicted as the disturbance-torque normal value. In this case, the threshold is a value obtained by adding the certain value (k) to the disturbance torque ($P_1$). This threshold is greater than the disturbance torque ($P_0$) at the failure diagnosis time ($t_0$). Hence, in the comparative example, it will be wrongly determined that no failure has occurred. In contrast, a disturbance torque ($P_2$) at the repair-maintenance time ($t_2$) before the start point ($t_1$) in FIG. 9 is predicted as the disturbance-torque normal value (R'). Since the aged deterioration component is taken into account, the threshold ($\alpha$=R'+k) is smaller than that of the comparative example and is less than the disturbance torque ($P_0$) at the failure diagnosis time ($t_0$). Hence, in the second embodiment, it will be determined that a failure has occurred. The same applies to FIG. 11.

The torque-normal-value prediction circuit 30 predicts the disturbance-torque normal value (R') by using a regression equation including a straight line and the function presented in equation 2 with the time-series change in the disturbance torque (Tq) acquired during the first period ($T_1$). Since the disturbance torque (Tq) can be approximated using the regression equation, the disturbance-torque normal value (R') can be accurately predicted.

In the case where repair or maintenance was implemented in the second period (Tx) preceding the failure diagnosis time ($t_0$), the torque-normal-value prediction circuit 30 predicts the disturbance-torque normal value (R') while assuming the time when the repair or maintenance was implemented as the time when the robot 1 operates normally. As illustrated in FIG. 13, a disturbance torque that has decreased immediately after implementing repair or maintenance can be considered the disturbance-torque normal value (R'). Thus, it is possible to perform an accurate failure diagnosis even in a case where the disturbance torque has increased due to aged deterioration.

In the case where repair or maintenance was not implemented in the second period preceding the failure diagnosis time, the torque-normal-value prediction circuit 30 predicts the disturbance-torque normal value with the seasonal fluctuation of the disturbance torque taken into account. The torque-normal-value prediction circuit 30 assumes a past time coinciding in seasonal fluctuation with the failure diagnosis time as the time when the robot 1 operates normally. By taking the seasonal fluctuation of the disturbance torque into account, it is possible to accurately predict a past disturbance torque generated a long time before the failure diagnosis time.

As illustrated in FIG. 11, the torque-normal-value prediction circuit 30 uses the function (FCL), which combines a sinusoidal wave approximating the seasonal fluctuation and a straight line approximating the aged deterioration, as a regression equation. This makes it possible to remove the seasonal fluctuation component and thus accurately predict the disturbance-torque normal value (R').

Although embodiments of the present invention have been described above, it should understood that the statements and the drawings constituting part of this disclosure do not limit this invention. Various alternative embodiments, examples, and operation techniques will become apparent to those skilled in the art from this disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 robot
2 robot control unit
3 failure diagnostic unit
6 servomotor (motor)
11 servo control part (torque detection part)
23 failure diagnostic device
24 position detection part
25 routine-operation determination circuit
26 reference-value calculation circuit
27 torque correction circuit
28 failure diagnostic circuit
29 repair-maintenance-information acquisition circuit
30 torque-normal-value prediction circuit
31 threshold setting circuit
FC seasonal fluctuation (sinusoidal wave)
FCL function
R' disturbance-torque normal value
Tq disturbance torque
Tq' corrected disturbance torque
$T_1$ first period
Tx second period
$\alpha$ threshold

The invention claimed is:
1. A failure diagnostic device for performing a failure diagnosis on a first multi-axis robot or a second multi-axis robot, the first and second multi-axis robots being industrial robots, comprising:

a robot controller that detects a movement position which is a rotational angle position of each of joint shafts included in the respective first and second multi-axis robots;

a torque detection circuit that detects a disturbance torque applied to the joint shaft included in the respective first and second multi-axis robots;

a routine-operation determination circuit that determines whether or not the respective first and second multi-axis robots are executing a predefined routine operation, which is common to the first and second multi-axis robots, from the movement position detected by the robot controller;

a reference-value calculation circuit that calculates a first disturbance torque reference value for the first multi-axis robot and a second disturbance torque reference value for the second multi-axis robot from the corresponding disturbance torques detected while the respective first and second multi-axis robots execute the predefined routine operation;

a torque correction circuit that calculates a first corrected disturbance torque for the first multi-axis robot by correcting the disturbance torque detected while the first multi-axis robot executes an operation different from the predefined routine operation by using the first disturbance torque reference value, and calculates a second corrected disturbance torque for the second multi-axis robot by correcting the disturbance torque detected while the second multi-axis robot executes an operation different from the routine operation, using the second disturbance torque reference value; and a failure diagnostic circuit that performs a failure diagnosis on the first multi-axis robot by comparing the first corrected disturbance torque and a threshold, or on the second multi-axis robot by comparing the second corrected disturbance torque and the threshold, wherein the failure diagnostic circuit diagnoses that the first multi-axis robot has failed if the first corrected disturbance torque exceeds the threshold, and diagnoses that the second multi-axis robot has failed if the second corrected disturbance torque exceeds the threshold.

2. The failure diagnostic device according to claim 1, wherein the reference-value calculation circuit calculates a first representative value of the disturbance torque and a first amount of change in the disturbance torque as the first disturbance torque reference value, and calculates a second representative value of the disturbance torque and a second amount of change in the disturbance torque as the second disturbance torque reference value, and wherein the torque correction circuit acquires the first corrected disturbance torque by subtracting the first representative value from the disturbance torque and dividing a value resulting from the subtraction by the first amount of change, and acquires the second corrected disturbance torque by subtracting the second representative value from the disturbance torque and dividing a value resulting from the subtraction by the second amount of change.

3. The failure diagnostic device according to claim 2, wherein the first and second representative values are averages of the disturbance torque detected during the execution of the routine operation by the first and second multi-axis robots, respectively, and wherein the first and second amounts of change are standard deviations of the disturbance torque detected during the execution of the routine operation by the first and second multi-axis robots, respectively.

4. The failure diagnostic device according to claim 2, wherein the first and second representative values are smallest values of the disturbance torque detected during the execution of the routine operation by the first and second multi-axis robots, respectively, and wherein the first and second amounts of change are differences between a largest value and the smallest value of the disturbance torque detected during the execution of the routine operation by the first and second multi-axis robots, respectively.

5. The failure diagnostic device according to claim 1, further comprising:

a repair-maintenance-information acquisition circuit that acquires information on a status of implementation of repair or maintenance on the first multi-axis robot or the second multi-axis robot;

a torque-normal-value prediction circuit that predicts a disturbance torque normal value, which is the disturbance torque at a time when the first multi-axis robot or the second multi-axis robot operates normally, by taking into account the information acquired by the repair-maintenance-information acquisition circuit; and a threshold setting circuit that sets the threshold based on the disturbance torque normal value, predicted by the torque-normal-value prediction circuit, wherein the torque-normal-value prediction circuit predicts the disturbance torque normal value based on data on a disturbance torque acquired during a first predetermined period.

6. The failure diagnostic device according to claim 5, wherein the torque-normal-value prediction circuit predicts the disturbance torque normal value by using a regression equation with time-series change in the disturbance torque acquired during the first predetermined period.

7. The failure diagnostic device according to claim 5, wherein in a case where the repair or the maintenance was implemented in a second predetermined period preceding a failure diagnosis time, the torque-normal-value prediction circuit predicts the disturbance torque normal value while assuming a time when the repair or the maintenance was implemented as the time when the first multi-axis robot or the second multi-axis robot began to operate normally for a first time of a deployment for operation.

8. The failure diagnostic device according to claim 6, wherein the torque-normal-value prediction circuit uses, as the regression equation, a function combining a sinusoidal wave approximating a seasonal fluctuation and a straight line approximating aged deterioration.

9. The failure diagnostic device according to claim 1, wherein the torque correction circuit acquires the corrected disturbance torque standardized between the first and second multi-axis robots or between different operations.

10. The failure diagnostic device according to claim 1, wherein the threshold is a value fixed regardless of a content of the operation or regardless of which robot executes the operation.

11. The failure diagnostic device according to claim 1, wherein the routine operation is a grinding operation of grinding a tip of a weld gun.

12. A failure diagnostic method of performing a failure diagnosis on a first multi-axis robot or a second multi-axis robot, the first and second multi-axis robots being industrial robots, comprising:

detecting a movement position which is a rotational angle position of each of joint shafts included in the respective first and second multi-axis robot;

detecting a disturbance torque applied to the joint shaft included in the respective first and second multi-axis robots;

determining whether or not the respective first and second multi-axis robots are executing a predefined routine operation, which is common to the first and second multi-axis robots, from the detected movement position;

calculating a first disturbance torque reference value for the first multi-axis robot and a second disturbance torque reference value for the second multi-axis robot from the corresponding disturbance torques detected while the respective first and second multi-axis robots execute the predefined routine operation;

calculating a first corrected disturbance torque for the first multi-axis robot by correcting the disturbance torque detected while the first multi-axis robot executes an operation different from the predefined routine operation, using the first disturbance torque reference value, and calculating a second corrected disturbance torque for the second multi-axis robot by correcting the disturbance torque detected while the second multi-axis robot executes an operation different from the routine operation, using the second disturbance torque reference value;

performing a failure diagnosis on the first or second multi-axis robot by comparing the first or second acquired corrected disturbance torque and a threshold; and diagnosing that the first multi-axis robot has failed if the first corrected disturbance torque exceeds the threshold, and diagnosing that the second multi-axis robot has failed if the second corrected disturbance torque exceeds the threshold.

* * * * *